United States Patent [19]
Barry et al.

[11] Patent Number: 6,030,559
[45] Date of Patent: Feb. 29, 2000

[54] METHOD FOR THE CONTINUOUS MANUFACTURE OF PLASTIC FOAM

[75] Inventors: Leon F. Barry; Robert W. Simpson, both of Pinellas County, Fla.

[73] Assignee: Celotex Corporation, Tampa, Fla.

[21] Appl. No.: 09/186,197

[22] Filed: Nov. 4, 1998

Related U.S. Application Data

[63] Continuation-in-part of application No. 08/801,074, Feb. 14, 1997, abandoned.

[51] Int. Cl.[7] .................................................. B29C 44/24
[52] U.S. Cl. ........................ 264/46.3; 264/46.2; 264/46.5; 264/257; 264/258; 264/273
[58] Field of Search ............................... 264/273, 257, 264/258, 46.2, 46.3, 46.5

[56] References Cited

U.S. PATENT DOCUMENTS

| | | | |
|---|---|---|---|
| 3,172,072 | 3/1965 | Willy | 338/210 |
| 3,182,587 | 5/1965 | Woodhall | 100/47 |
| 3,298,884 | 1/1967 | Willy | 156/79 |
| 3,726,951 | 4/1973 | Smith et al. | 264/46 |
| 3,895,159 | 7/1975 | Yoshimura | 428/227 |
| 4,022,644 | 5/1977 | Smith, Jr. | 156/79 |
| 4,025,256 | 5/1977 | Heller | 425/114 |
| 4,025,687 | 5/1977 | Wooler et al. | 428/310 |
| 4,028,158 | 6/1977 | Hipchen et al. | 156/79 |
| 4,073,998 | 2/1978 | O'Connor | 428/310 |
| 4,118,533 | 10/1978 | Hipchen et al. | 428/297 |
| 4,121,957 | 10/1978 | Allen | 156/79 |
| 4,186,536 | 2/1980 | Piazza | 52/309.12 |
| 4,283,457 | 8/1981 | Kolsky et al. | 428/285 |
| 4,292,363 | 9/1981 | Briggs | 428/247 |
| 4,318,761 | 3/1982 | Dockray et al. | 264/46.2 |
| 4,425,396 | 1/1984 | Hartman | 428/220 |
| 4,438,166 | 3/1984 | Gluck et al. | 428/113 |
| 4,447,484 | 5/1984 | Slosberg et al. | 428/137 |
| 4,495,013 | 1/1985 | Walker et al. | 156/79 |
| 4,572,865 | 2/1986 | Gluck et al. | 428/309.9 |
| 4,710,415 | 12/1987 | Slosberg et al. | 428/48 |
| 4,804,425 | 2/1989 | Hoffman et al. | 156/73 |
| 4,877,671 | 10/1989 | Stagg et al. | 428/139 |
| 4,938,819 | 7/1990 | Ishii et al. | 156/78 |
| 5,073,429 | 12/1991 | Steinke et al. | 428/71 |
| 5,114,755 | 5/1992 | Canady et al. | 427/373 |

FOREIGN PATENT DOCUMENTS

| | | | |
|---|---|---|---|
| 56-113438 | 9/1981 | Japan | 264/46.3 |
| 59-1255 | 1/1984 | Japan | 264/46.3 |

OTHER PUBLICATIONS

"A New Development Machine for the Continuous Lamination of Rigid Urethane Foam", *Rubber and Plastics Age*, vol. 47, No. 1, (1966), pp. 57–59.

*Primary Examiner*—Allan R. Kuhns
*Attorney, Agent, or Firm*—Charles W. Vanecek

[57] ABSTRACT

A method for continuously manufacturing a plastic foam reinforced by at least one fibrous material comprising continuously conveying a carrier along a production line, supplying on top of the carrier a foam-forming mixture and at least one continuously moving fibrous material, the fibrous material being non-expansible and having holes penetrable by the mixture, the mixture being supplied above both the fibrous material and the carrier or below the fibrous material and between the fibrous material and the carrier, passing the carrier, mixture and fibrous material between two spaced opposed constricting members which lie one above the other and form therebetween a metering gap for distributing the mixture over the carrier and fibrous material, and allowing the mixture after passing through the gap to freely expand and penetrate the holes of the fibrous material to form a reinforced plastic foam which has an exceptionally flat surface.

20 Claims, 3 Drawing Sheets

METHOD FOR THE CONTINUOUS MANUFACTURE OF PLASTIC FOAM

This is a continuation-in-part of application Ser. No. 08/801,074, filed Feb. 14, 1997 now abandoned.

BACKGROUND OF THE INVENTION

1. Field of the Invention

This invention relates to the manufacture of panels of reinforced plastic foam, and particularly to a method for imparting a uniform thickness to the panels without diminishing the requisite properties of the panels.

2. Description of the Prior Art

Methods for the continuous production of a rigid insulating polymeric foam board comprising a foam layer sandwiched between facing materials are well known. Such boards are typically used in the construction of walls, ceilings, roofs and the like. In the production, a foam-forming mixture is customarily delivered between two continuous webs of sheet material which are transported through various processing stations.

In order to avoid a substantial waste of material and provide uniformly thick and aesthetically appealing foam boards, it is highly desirable that the boards be produced with a substantially rectangular cross-section, and without a round top or other nonuniformity in the boards' dimensions. Heretofore a commonly practiced method for controlling the caliper or thickness of the boards has been the so-called "restrained rise" type. Here the foamable material and facers are directed between flatness-promoting confining means, such as a pair of spaced conveyor belts, which suitably are positioned apart a distance less than the thickness the combination of foam and facers would otherwise reach if allowed to expand unrestrictedly.

Another conventional method for continuously producing plastic foams is the "free rise" type, such as disclosed in U.S. Pat. No. 4,028,158, wherein the thickness of the finished foam board is controlled by passing the foamable mixture and facers through a metered gap which is preferably provided by the nip of two rotating rolls. Although this metering means avoids the time-consuming and cumbersome operation involved in using the conveyors of the restrained rise system, the caliper variation in the cross direction of foam boards produced on free rise lines, especially the thicker boards, turns out to be considerably greater than that of "restrained rise" boards. It would be highly desirable if a method could be found for producing foam boards having a high degree of uniformity in surface flatness combined with the other properties required in such boards without sacrificing the speed and efficiency which characterize free rise foam production lines.

OBJECTS OF THE INVENTION

It is accordingly an object of the invention to provide a rigid or flexible plastic foam having an especially flat surface, an appealing appearance, and a combination of other good properties, and an improved method for producing the foam.

It is another object of the invention to produce a reinforced plastic foam, particularly a rigid polyurethane or polyisocyanurate foam, which has a highly uniform thickness and overall good properties, including excellent thermal insulative properties, low friability and good dimensional stability, thermal resistance and compressive strength.

It is still another object of the invention to provide a method for reinforcing plastic foam in free rise foam manufacture and thereby regulating the thickness of the resultant foams while economizing on material usage.

It is a further object of the invention to provide closed cell foam materials which can be used in building panels which are highly insulating, thermally resistant, dimensionally stable, and low in friability.

It is a still further object of the invention to provide uniformly thick foam boards which are well suited for constructional installations, such as for fitting in edge moldings and being taped at the seam of two boards.

SUMMARY OF THE INVENTION

The foregoing and other objects have been achieved by the process of the present invention for the continuous production of a reinforced plastic foam structure, wherein a foam-forming composition is deposited on a moving carrier and at least one web of reinforcing fibrous material having holes for penetration by the composition is also supplied above the carrier. The fibrous material can be a single layer or more than one layer. Fibers of the discontinuous reinforcing web are spaced apart, with the average distance between fibers preferably greater than $\frac{1}{32}$ inch, to provide the openings through which the foamable mixture can readily pass. The configuration of the reinforcing web is variable, with the penetrable openings suitably spaced over the full extent of its network for uniform penetration by the mixture. The average diameter of the openings, after circularization, of the reinforcing web advantageously ranges from as small as $\frac{3}{32}$ inch up to 2 inches or more, preferably from about $\frac{1}{8}$ inch up to 1 inch. The reinforcing web is advantageously an endless sheet like the moving carrier and coextensive with the carrier. Typically, the reinforcing web will be a scrim of fiberglass fibers having a screen-like appearance. One or more other fibrous reinforcement materials may be used in conjunction with the web(s) of the invention.

The carrier may be a flexible or rigid material. Another moving material is suitably placed over the deposited mixture and reinforcement web or webs so that the finished product will advantageously have a reinforced plastic foam core sandwiched between upper and lower facing materials. The apparatus includes a conveyor assembly for continuously advancing the reinforcing web(s) and the carrier and covering materials, either or both of the latter materials being optionally removable to yield a reinforced foam which is partially or completely unfaced.

The composite of the deposited mixture and reinforcement material enclosed between the continuously advancing carrier and covering materials is passed through a gap which is provided by the nip of a metering device. The metering device comprises two spaced opposed members forming therebetween a metering gap and capable of constricting a liquid mixture passed through the gap. At least one member of the device is advantageously adjustable toward and away from the other to vary the nip gap. Various shapes and materials of construction, e.g., rolls, bars or plates made of steel or other materials, may be used in the makeup of the constricting members of the metering device. Advantageously, the upper member of the metering device is a cylindrical roller, and generally both the upper and lower members are cylindrical rollers. The foam forming mixture is forced by the pressure of the constricting members through the open mesh of the reinforcing web and around the individual fibrous elements thereof.

After passing through the gap defined by the metering means, the foam-forming mixture advances into an expansion zone wherein the mixture expands to the cured state. In the expansion zone, the foam-forming mixture is allowed to expand freely without constraint by a leveling member such as the upper conveyor disclosed in U.S. Pat. No. 4,572,865. Despite this absence of the restraining member, the usual board crowning encountered in "free rise" foaming is avoided due to the presence of the reinforcing mesh. Flattening is accomplished by the agency of the fibrous material, which is non-expansible. The fibrous material acts to even the developing foam. Curing can be facilitated through the application of heat which may be controllably added by the circulation of hot air. The finished foam structure may then be periodically severed into finite lengths for commercial use.

The invention is particularly useful in the production of foam boards having a rigid plastic foam core which may be formed from any suitable plastic foam-forming composition. The invention, however, is also applicable to flexible foams. Of especial interest are foam cores consisting of an isocyanate-based foam material, including polyurethane and polyisocyanurate foams.

BRIEF DESCRIPTION OF THE DRAWINGS

The invention will now be described with reference to the accompanying drawings in which.

DETAILED DESCRIPTION OF THE INVENTION

Figure 1:
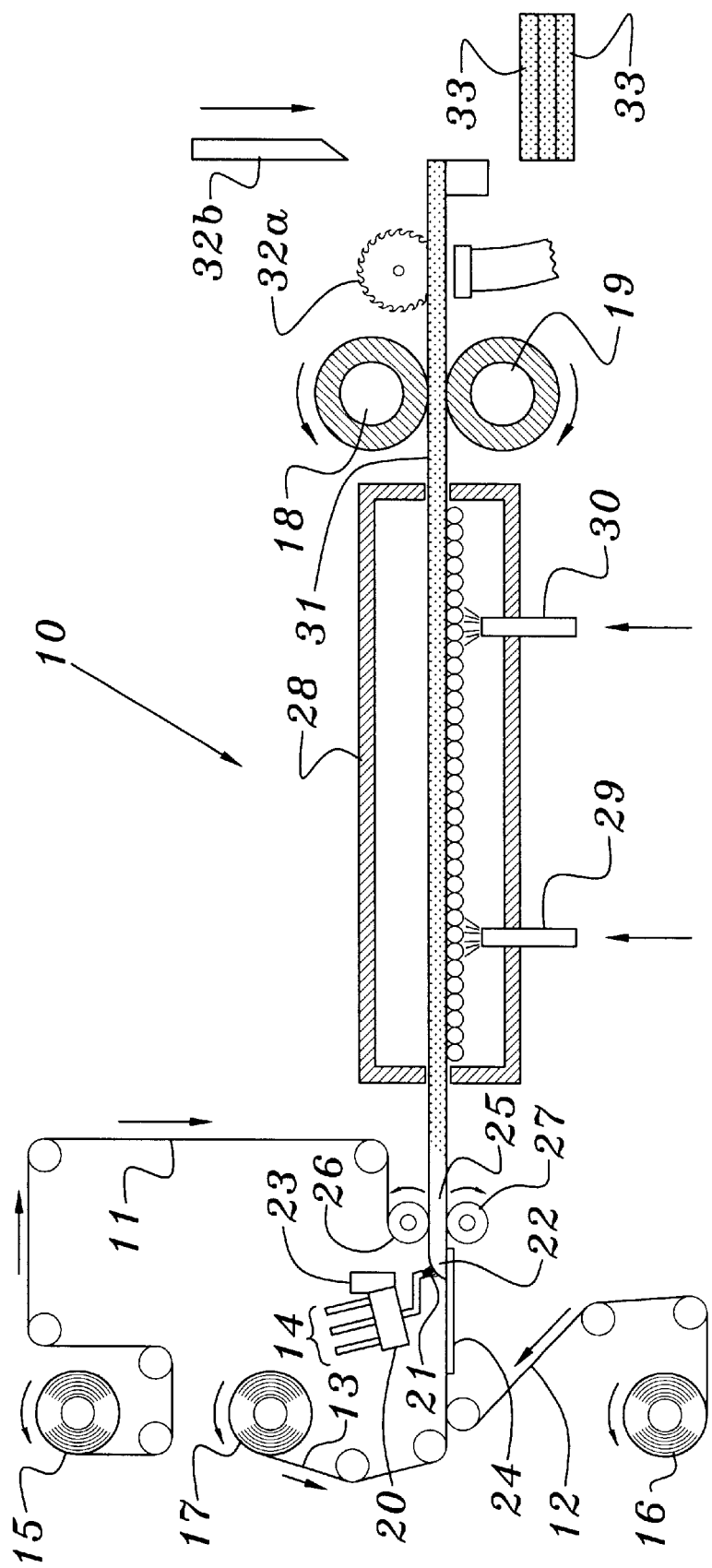
FIG. 1 is a schematic elevation of an apparatus suitable for practicing the free-rise process of the invention.

Referring to FIG. 1, there is shown schematically an apparatus 10 suitable for the continuous production of reinforced foam plastic in accordance with the process of the present invention. Apparatus 10 includes means for advancing upper and lower facing materials or substrates 11 and 12 and reinforcing fibrous material or web 13 and means for applying a foam-forming mixture between the facing materials and onto the web. This reinforcing fibrous material is characterized by an openwork pattern. The foam-forming ingredients are stored, pumped and metered by conventional equipment (not shown) and fed through a flexible conduit or conduits 14 for application on the production line.

The foam-forming mixture is one which will result in a rigid, flexible or semi-rigid polymeric foam. The polymer compositions falling within the ambit of the present invention may be broadly selected from any of those which can be blown into foam. The rigid cellular polymers of the invention desirably have a closed cell content of at least about 75%, and more preferably of at least about 85% of the cells. The polymer compositions may be thermoplastic or thermoset. Suitable polymers include polyurethane, polyisocyanurates, phenolic, rubber, polyvinyl chloride, urea-aldehyde, melamine-aldehyde, polystyrene, polycarbonates, polyetherimides, polyamides, polyesters, polyvinylidene chloride, polymethyl-methacrylate, polypropylene, polyethylene, cellulose acetate, epoxy, acrylonitrile-butadiene-styrene copolymer, and silicone.

Figure 2:
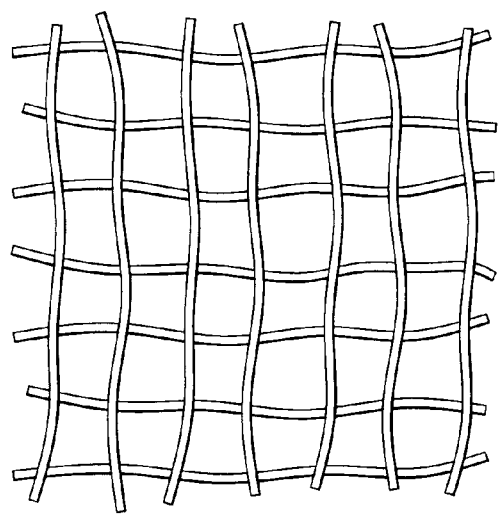
FIG. 2 is a fragmentary top view of a first embodiment of the fibrous web for use in the free-rise process of the invention.
Figure 3:
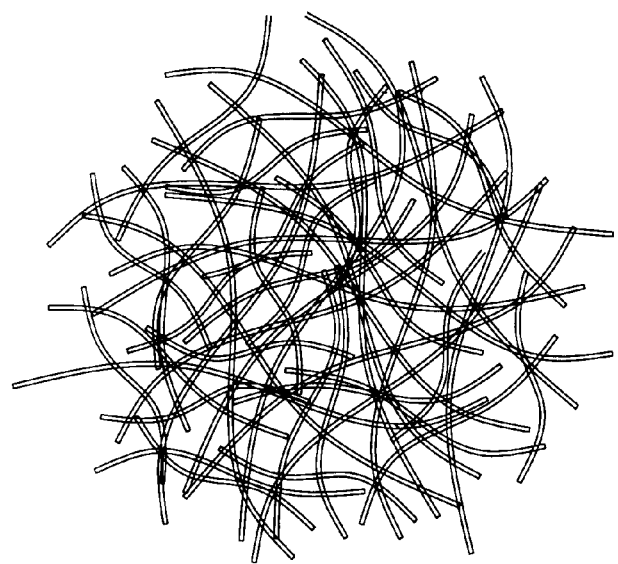
FIG. 3 is a fragmentary top view of a second embodiment of the fibrous web for use in the free-rise process of the invention.

Web 13 has discrete openings between its fibers so that the foam-forming mixture will readily penetrate through it and around its fibers. The fibers of the web may be distributed in many different arrangements, such as an evenly spaced crisscross pattern, as in FIG. 2 or a randomly intersecting pattern, as in FIG. 3. Whatever the pattern, the web's fibrous material must be discontinuous for easy penetration by the foamable mixture and not the type of fibrous mat disclosed in U.S. Pat. No. 4,028,158 wherein the mat's interstices for effective penetration by the mixture are developed during the foam-forming operation. The web's fibrous material 13 is non-expansible and thus unlike the expansible mat of the prior art which opens under the influence of the expanding foam to form a series of separate layers in the foam. Contrarily, fibrous material 13 is not expansible under the influence of the expansion of the foam-forming mixture. Even when fibrous material 13 comprises more than one layer, the layers are interlocked, e.g., glued together, to prevent separation. Web 13 may, for example, have an average opening (circularized) between fibers ranging in size from about 4 mm to 16 mm. Web 13 is advantageously about 0.010 to 0.02 inch thick and about 48 to 53 inches wide, and weighs about 0.5 to 1.0 lb./100 square feet.

The fibers of web 13 may be woven or non-woven, inorganic or organic fibers, both natural and synthetic, or combinations of these fibers. Examples of inorganic fibers are gypsum fibers, various glass fibers, and graphite fibers. The natural organic fibers include cellulosic fibers such as cotton, linen, jute, flax and hemp, kraft pulp, lignocellulosic fibers and wool, as well as regenerated cellulose fibers, including cellulose acetate and viscose rayons. As examples of synthetic organic fibers may be mentioned polyester, polyamide, polyacrylonitrile, polyvinyl alcohol, 'Aramid' aromatic polyamide, polypropylene, high density polyethylene, polyvinyl chloride and carbon fibers. The fibers preferably are held together by a binder or adhesive. Preferred adhesives include polyvinyl alcohol adhesives.

A preferred web 13 is a glass fiber scrim. The size of the fibers of the scrim can vary considerably from fine to very heavy filaments, and the filaments can be present as single or multiple strands. A high degree of variation is also possible in the arrangement of the reinforcing filaments and the mesh size and shape of the scrim. The fibers are preferably arranged in a multi-directional pattern so as to provide reinforcement in more than one direction. Possible shapes are rectangular, square, diamond, etc. Suitable glass scrims have a mesh construction of 2×2 to 20×20 filament elements per square inch.

The facing substrates may be composed of material which is flexible or rigid. Rigid facing materials can suitably be in the form of discrete sheets which are fed onto the production line in abutment. More conveniently, the facers are flexible material which is in the form of continuous or semicontinuous sheets fed from rolls. A wide variety of materials are employable as the facers. For example, the carrier substrate on the line can be a rigid or flexible material, such as perlite board, gypsum board, fiberboard, a metal sheet such as steel or aluminum, plywood, paper, paperboard, plastic foils, asphalt-saturated felt, a fiber glass sheet, an asphalt fiber glass sheet, etc., while the covering or upper facer is suitably a flexible material, such as asphalt-saturated felt, an asphalt fiber glass sheet, a fiber glass sheet, paper, paperboard, a metal or plastic foil, etc. The facers may be made from combinations of these materials.

As shown in FIG. 1, each of upper and lower facing sheets 11 and 12 and reinforcing web 13 are flexible materials which are fed from supply rolls 15, 16 and 17, respectively. The apparatus 10 is also provided with pull rolls 18 and 19, and by virtue of rotation of these pull rolls sheets 11 and 12 and reinforcing web 13 are pulled from their supply rolls and onward along the production line. Reinforcing web 13 is pulled to a position on top of lower sheet 12. The foam-forming mixture, which advantageously is composed of polyurethane or polyisocyanurate foam forming chemicals, is delivered to a mixing head 20 and agitated therein. The mixed chemicals are then deposited from an applicator 21 onto advancing web 13. The chemicals can also be dispensed on sheet 11 or on both web 13 and sheet 11.

Various application devices, both stationary and moving, may be employed in depositing the chemicals. Even distribution of the foamable mix over the surface of the sheet material can be achieved by dispensing the chemicals from applicators having one or more delivery heads. In one preferred embodiment, applicator 21 comprises a nozzle which is reciprocated transversely of the web 13 to supply a stream of a liquid foamable mixture 22 uniformly thereacross. The back and forth movement of the mixing head and applicator is caused by a reciprocating means 23. In another embodiment involving the deposition of froth chemicals, the mixing head 20 deposits the foamable chemicals through an applicator capable of laying down a wide band of froth on web 13. Advantageously, the applicator can be oscillated transversely a short distance to either side of a central point above web 13. A high viscosity froth is beneficially employed with a fibrous web having relatively large openings to ensure adequate penetration. Additionally, in a preferred application, the fibrous web is placed on top of the froth, as illustrated below in FIG. 4.

As shown in FIG. 1, the start or upstream end of the production line beneficially includes a smooth-topped platform or bed 24 which extends from upstream of the deposition point of the foamable mixture to a point upstream of and adjacent the constricting nip 25 between closely spaced parallel rollers 26 and 27. Web 13 and lower sheet 12 move downstream in a horizontal plane along the upper surface of bed plate 24 positioned as illustrated in FIG. 1. Bed plate 24 is adjustably mounted so that it can be inclined from the horizontal to elevate its downstream transverse edge (adjacent nip 25) above its upstream transverse edge. An improved control of the foam chemical bank has been achieved by thus tilting the web 13 and sheet 12 so that these materials and the foamable chemicals thereon advance with an upward slope upstream of the nip-defining rollers.

Immediately downstream of the laydown point of the foamable chemicals, upper facing sheet 11 is brought into contact with the top surface of the chemicals. As illustrated in FIG. 1, this contact is suitably effected by passing upper sheet 11 around roller 26 and through nip 25. In another favorable embodiment of the invention, the foamable mixture can be dispensed through applicator 21 onto the exposed surface of the sheet 11 as the latter passes around roller 26. In any event, between rollers 26 and 27 the upper and lower facing sheets are brought together in surface-to-surface opposition relative to each other, with the foamable mixture and reinforcing web 13 sandwiched in between. As the facing sheets are brought into closely spaced adjacency between rollers 26 and 27, the constriction at nip or gap 25 causes a rolling bank of foamable mixture to build up, whereby there is a surplus or backlog of material available to pass through the nip of the rolls. One or both of rollers 26 and 27 are advantageously vertically shiftable for control of the thickness of the facers and foamable mixture passing through the nip.

The nip 25 formed between the metering rollers 26 and 27 is accurately adjustable so as to insure contact of the foamable mixture with the fibers of web 13 and cause uniform distribution of the mixture, as well as uniform metering of the amount retained, as the facing sheets and enclosed fibers advance beyond this point. To provide for this precise adjustment of the nip gap, the upper roller 26 is preferably mounted on an adjustable support which permits the distance between its axis and the axis of the lower metering roller 27 to be varied so that the nip between the rollers can be adjusted from a wide gap to almost a zero setting. This arrangement provides a high degree of control of the final thickness in the resulting foam board, with the foamable mixture being allowed to expand thereafter substantially freely to develop its natural rise profile. The metering rollers thus serve as a means for bringing the facing sheets 11, 12 into spaced conjunction, and for distributing the foamable mixture 22 therebetween and between the fibers of web 13, as well as a means for performing a final metering operation, supplementing the initial rough metering afforded by applicator 21.

The foam-forming ingredients are suitably chosen and controlled to yield a mixture 22 having a viscosity which is manageable without difficulty by apparatus 10. Factors determining the viscosity, such as temperature and chemical reactivity, can be adjusted in known manner to beneficially involve and completely integrate fibrous material or web 13 in the foam-forming process. The viscosity will influence the size of the openings in web 13. As a rule of thumb, the greater the viscosity, the larger will be the openings, and, oppositely, the lower the viscosity, the smaller the openings need be. A foamable mixture 22 of appropriate viscosity, e.g., about 300 to 600 cps at 25° C., will penetrate the openings of web 13, and during the foaming process the web will be carried upwardly by the expanding mixture to a final position in the middle section of the foam core. Were the viscosity too great so as to inhibit complete penetration and encapsulation of the fibers of the web, a fault could develop whereby the foam board might separate or split along the plane of the web.

Especially effective foam-forming compositions for use in the process of the invention are those conventionally employed in forming rigid polyurethane foams, such as closed-cell PIR, PUR, and mixed PUR/PIR foams. Such foam-forming ingredients for the polyurethane and polyisocyanurate foams comprise polyisocyanates, polyfunctional, active hydrogen-containing compounds (e.g., polyester polyols), foaming agents, and catalysts, auxiliaries and additives as required (e.g., a surfactant). Included among such auxiliaries and additives are processing aids, viscosity reducers, flame retardants, dispersing agents, plasticizers, antioxidants, compatibility agents, fillers and pigments.

After passing between the nip of the two rollers 26 and 27, the faced composite passes into oven 28 and on along the generally horizontally extending production line, as shown in FIG. 1. Oven 28 provides an expansion zone for the foam-forming mixture. By varying the temperature of hot air from vents 29 and 30, the temperature within the oven 28 is maintained within the desired limits of 100° F. to 300° F., and preferably 175° F. to 250° F. The foam, under the influence of the heat added to the oven, cures to form faced foam plastic 31. The product 31 then leaves the oven 28, passes between the pull rolls 18 and 19, and is cut by side edge and length cutting means 32a and 32b into finite lengths, thereby forming discrete panels 33 of the product.

The total thickness of the resultant foam boards of the invention may be from about 0.5 to 6 inches. In a preferred embodiment wherein web 13 is introduced between the nip-defining means as illustrated in FIG. 1, the free-rise expansion is conducted to produce relatively thin and flat foam boards whose thickness is preferably in the range from about ½ to 1 inch, with the web being lifted up to become located in the interior, typically the central region, of the foam core.

Figure 4:
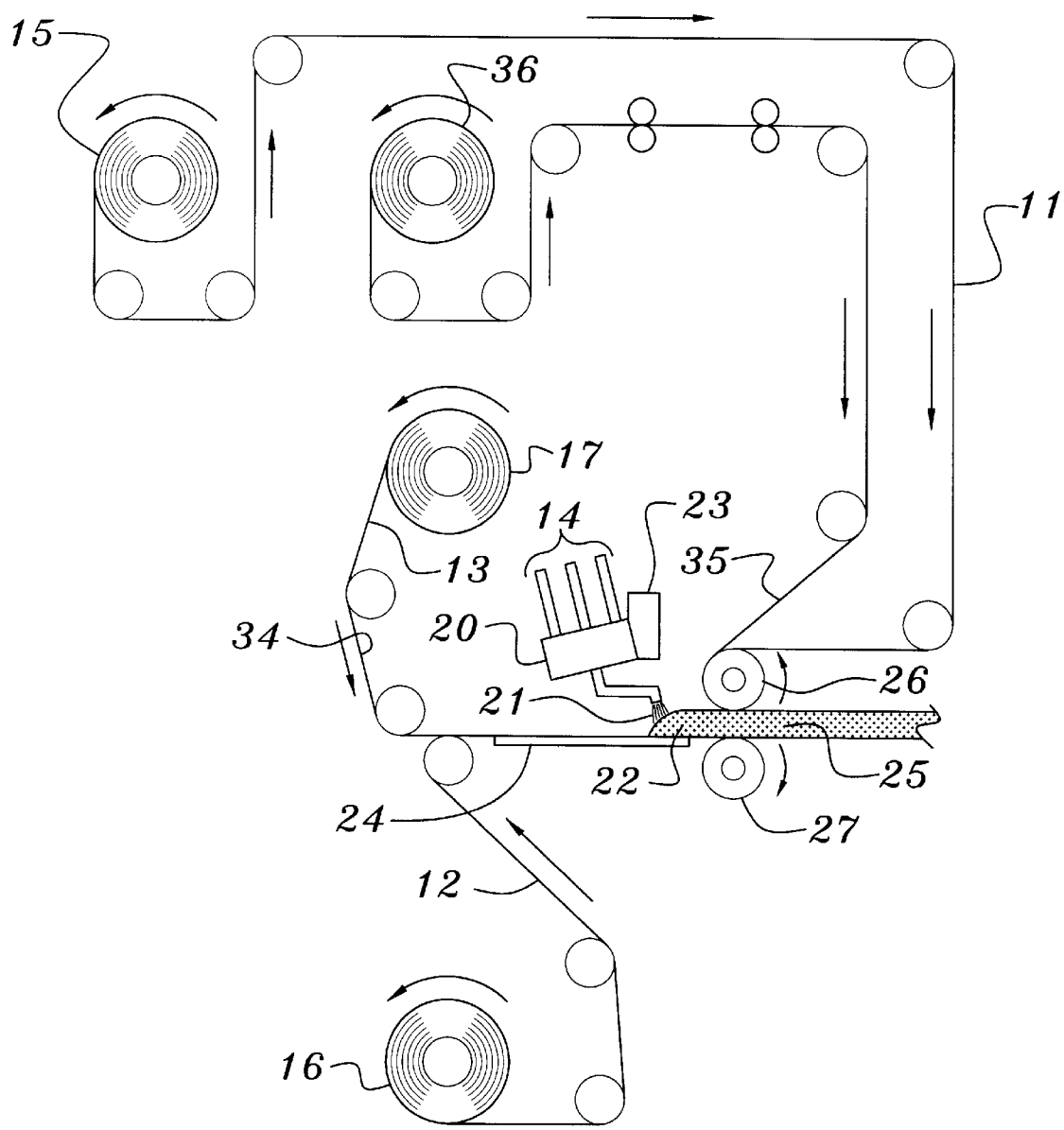
FIG. 4 is a schematic elevation of a portion of the apparatus of FIG. 1 showing an additional fibrous web being fed to the nip roll in accordance with the free-rise process of the invention.

Referring now to FIG. 4, the apparatus is the same as that shown in FIG. 1 but here, in addition to a lower reinforcing fibrous material 34 an upper reinforcing fibrous material 35 is being fed from supply roll 36 into the apparatus. Either or both of fibrous materials 34 and 35 are an open-textured fibrous material or web of the invention as described hereinbefore. Alternatively, an open-textured material 35 may be fed into the apparatus without concomitantly incorporating a lower fibrous material. When both fibrous materials are open-textured, they can have the same or different compositions.

As shown in FIG. 4, the two fibrous materials 34 and 35 are fed from rolls 17 and 36, respectively, toward the nip 25 between the two rotating metering rollers 26 and 27. By virtue of rotation of the pull rolls 18 and 19, the lower facer 12 and fibrous material 34 and the upper facer 11 and fibrous material 35 are pulled from their respective rolls. At the metering rollers, the material 34 and facer 12 below it are brought together in surface-to-surface opposition relative to each other, and the foam-forming mixture 22 is deposited onto fibrous material 34. The upper facer 11 and fibrous material 35 also come into surface-to-surface contact as they are passed around metering roller 26 and through nip 25. The upper and lower facers and fibrous materials having the foam-forming mixture 22 therebetween, pass through the nip of the metering rollers. The mixture 22 penetrates through the openings of the open-textured material(s). Thereafter, expansion of mixture 22 and curing of the foam are accomplished in oven 28 in the manner hereinbefore described.

Among the various other fibrous reinforcement materials which may be used in combination with the open-textured webs in accordance with the method of the invention is the type of glass mat used in producing the structural laminate of U.S. Pat. No. 4,028,158, i.e., a mat of long, generally straight glass fibers which are arranged in layers, the direction of the glass fibers in each layer being at an angle to the direction of the glass fibers in each next adjacent layer. This so-called "Modigliani" mat is suitably employed as the lower material 34 in conjunction with an open-textured web as the upper material 35 in the apparatus of FIG. 4. In this preferred embodiment, the glass fibers of the Modigliani mat expand under the influence of the expansion of the foam-forming mixture 22 to become distributed in the foam in planes substantially parallel to the planes of the facing sheets 11 and 12, while upper web 35 is pressed against the upper facer 11. This embodiment of the invention is particularly suitable for the formation of relatively thick and flat foam boards, e.g., boards having a thickness in the range from about 2 to 4 inches.

The present invention is further illustrated by the following example in which all parts and percentages are by weight unless otherwise indicated.

EXAMPLE

This example illustrates, by reference to the drawings, the production of insulation foam boards in a free-rise process with the incorporation of a netlike reinforcing web of the invention.

A. Production of 1 Inch Thick Boards

The following isocyanurate formulation was used in preparing the foam core of the insulation boards.

| Foam-Forming Ingredients | Parts by Weight |
| --- | --- |
| Polymethylene polyphenylisocyanate having an equivalent weight of 138 | 62.8 |
| Aromatic polyester polyol having an equivalent weight of 135 | 21.7 |
| Blowing agent | 13.5 |
| Surfactant | 0.6 |
| Catalyst | 1.4 |

As illustrated in FIG. 1, top and bottom facers 11 and 12, each of which was a 1 mil aluminum foil, were fed from rolls 15 and 16 toward the nip of metering rolls 26 and 27. A glass scrim 13, having a polyvinyl alcohol binder, a weight of 2.9 gm/ft$^2$ and a mesh construction provided by 5×5 filamentary elements per square inch, was fed from roll 17. The facers and scrim were pulled along the production line by pull rolls 18, 19. Top facing sheet 11 was passed around top metering roll 26 and bottom facing sheet 12 was passed into the gap 25 between the metering rolls. Glass scrim 13 was also conveyed into the gap between the metering rolls. Oven 28 was heated to provide a zone above vent 29 at a temperature of about 190° F., and a zone above vent 30 at about 210° F. The above-mentioned foam-forming ingredients were thoroughly mixed in mixing head 20 and discharged just upstream of the nip of the metering rolls through tube 21 onto the scrim 13 and lower facer 12, which acted as a conveyor. The facing sheets 11 and 12 having the foamable mixture 22 and scrim 13 therebetween passed from the upstream end of the apparatus through the nip 25 of the two metering rolls 26 and 27 and on downstream. The distance between rolls 26 and 27 was preset to produce boards having an average thickness of 1 inch.

During the reaction and expansion of the foamable chemicals in oven 28, the scrim 13 was carried to the approximate middle of the core foam thickness and imparted an extremely flat surface to the resultant board, which passed between the two pull rolls 18, 19 and was trimmed to a 48" width by edge trim circular saws 32a and cut to the desired length with a travelling cut-off knife 32b. Various properties of the foam boards are reported in the Table below.

B. Production of 4 Inch Thick Boards

As illustrated in FIG. 4 taken in conjunction with FIG. 1, foam boards were produced utilizing top and bottom facers 11 and 12 each of which was a 1 mil aluminum foil, a glass scrim 35 and a Modigliani mat 34. Scrim 35, having a polyvinyl alcohol binder, a weight of 2.9 gm/ft$^2$ and a 5×5 mesh construction, was fed under upper facer 11 and around top metering roll 26. Glass mat 34 of approximately 7.0 gm/ft$^2$ was fed from roll 17, threaded through a set of corrugating rolls (not shown) for breakage of glass fiber/binder bonds, and then conveyed onto lower facer 12. After this bond breakage, the foam-forming ingredients and amounts thereof as described above in Part A of this example were deposited on the Modigliani mat 34 and the outer facers and enclosed glass scrim, Modigliani mat and foamable chemicals were pulled through the gap 25 of the metering rolls. The oven zone above vent 29 was at about 180° F., and that above zone 30 at about 200° F. The distance between metering rolls 26 and 27 was preset to produce boards having an average thickness of 4 inches.

During board production in oven 28, the foamable mixture 22 rose so as to expand the mat 34 and force the scrim 35 up against the top facer 11. The resultant boards, which were cut to a suitable width and length, had an especially flat surface due to the presence of the glass scrim 35 in the foaming operation. Various board properties are shown in the Table below.

TABLE

PROPERTIES OF INSULATION BOARDS

|  | Scrim-Modified Boards | | Boards Without Scrim* |
|---|---|---|---|
| Thickness, in | 1 | 4 | 1 |
| Core Density, lb/ft$^3$ | 1.8 | 1.8 | 1.8 |
| K-factor, initial Btu-in/hr-ft$^2$-° F. | .120 | .120 | .120 |
| Shrinkage, width At −20° F., in | .0625 | .0625 | .0625 |
| Flexural Strength, lb/in$^2$ | 76.5 | | 63.9 |
| Thickness, Range in | .040 | .075 | .115 |

*Boards produced as in Part A of Example without incorporation of glass scrim 13.

The data presented in the above Table reveal that the physical properties of foam boards made in a free rise process are not adversely affected by the inclusion of an open-textured glass scrim. An improvement in flexural strength was realized in the case of the scrim-modified 1" thick boards. It is especially noteworthy that use of the glass scrim brings about the production of exceptionally flat boards, as evidenced by the very narrow thickness range for the scrim-modified 1" boards as compared to the 1" boards made without the scrim. Also, the glass scrim significantly improves foam shrinkage resistance, as evidenced by the equivalent shrinkages at −20° F. for the 1" and 4" scrim-modified boards, whereas the shrinkage at −20° F. of a 4" board reinforced with a Modigliani mat normally is about 0.5–1.0 inch.

We claim:

1. A method for the continuous manufacture of a plastic foam product reinforced by at least one fibrous material comprising continuously conveying a carrier along a production line, supplying on top of the carrier a foam-forming mixture and at least one continuously moving fibrous material, the fibrous material being non-expansible and having holes penetrable by the mixture, the mixture being supplied above both the fibrous material and the carrier or below the fibrous material and between the fibrous material and the carrier, passing the carrier, mixture and fibrous material between two spaced opposed constricting members which lie one above the other and form therebetween a metering gap for distributing the mixture over the carrier and fibrous material, and allowing the mixture after passing through the gap to freely expand and penetrate the holes of the fibrous material, the fibrous material not being expansible under the influence of the expansion of the foam-forming mixture, to form a reinforced plastic foam which has an exceptionally flat surface.

2. The method of claim 1 which includes the step of curing the deposited mixture in an oven downstream of the metering gap.

3. The method of claim 1 wherein one or more other fibrous reinforcement materials are supplied above the carrier.

4. The method of claim 1 wherein the carrier comprises a lower facing sheet, and an upper facing sheet is provided above the deposited mixture and fibrous material at a point upstream of the metering gap, whereby a composite sandwich of the upper and lower facing sheets with the deposited mixture and fibrous material therebetween is passed through the gap and on downstream along the production line.

5. The method of claim 4 wherein each constricting member comprises a horizontal rotatable roll.

6. The method of claim 5 wherein one or both of the rolls are vertically shiftable for control of the thickness of the gap.

7. The method of claim 6 wherein the mixture is supplied above both the fibrous material and the lower facing sheet.

8. The method of claim 7 wherein the thickness of the gap is preset to produce a plastic foam product having an average thickness of ½ to 1 inch.

9. The method of claim 7 wherein the foam-forming mixture comprises a mixture for forming a rigid polymer foam selected from the group consisting of polyurethane and polyisocyanurate foams.

10. The method of claim 7 wherein the foam-forming mixture comprises a mixture for forming a rigid polyisocyanurate form.

11. The method of claim 7 wherein each facing sheet is aluminum foil.

12. The method of claim 7 wherein the fibrous material is a glass fiber scrim.

13. The method of claim 12 wherein the average size of the openings between the fibers of the scrim is in the range from 1/32 inch to 2 inches.

14. The method of claim 6 wherein the mixture is supplied below the fibrous material and the upper facing sheet and a second continuously moving fabric is supplied between the mixture and the lower facing sheet, the second fabric being a mat of long, generally straight glass fibers arranged in layers, the direction of the glass fibers in each layer being at an angle to the direction of the glass fibers in each next adjacent layer, and the glass fibers of the second fabric being expansible under the influence of the expansion of the foam-forming mixture to become distributed in the plastic foam product.

15. The method of claim 14 wherein the thickness of the gap is preset to produce a plastic foam product having an average thickness of 2 to 4 inches.

16. The method of claim 14 wherein the foam-forming mixture comprises a mixture for forming a rigid polymer foam selected from the group consisting of polyurethane and polyisocyanurate foams.

17. The method of claim 14 wherein the foam-forming mixture comprises a mixture for forming a rigid polyisocyanurate foam.

18. The method of claim 14 wherein each facing sheet is aluminum foil.

19. The method of claim 14 wherein the fibrous material is a glass fiber scrim.

20. The method of claim 19 wherein the average size of the openings between the fibers of the scrim is in the range from 1/32 inch to 2 inches.

* * * * *